United States Patent [19]

Wagenknecht

[11] 4,039,146

[45] Aug. 2, 1977

[54] VARIABLE CYCLE PLUG NOZZLE AND FLAP AND METHOD OF OPERATING SAME

[75] Inventor: Conrad D. Wagenknecht, West Chester, Ohio

[73] Assignee: General Electric Company, Cincinnati, Ohio

[21] Appl. No.: 636,550

[22] Filed: Dec. 1, 1975

[51] Int. Cl.² .................. B64C 15/02; B64D 33/04
[52] U.S. Cl. .................. 239/265.25; 239/265.29; 239/265.33; 239/265.41
[58] Field of Search .............. 239/265.11, 265.13, 239/265.19, 265.25–265.33, 265.37–265.41; 60/228–230, 232, 241, 242, 261, 262, 263, 269, 271

[56] References Cited

U.S. PATENT DOCUMENTS

| | | | |
|---|---|---|---|
| 3,296,800 | 1/1967 | Keenan et al. | 60/261 X |
| 3,352,494 | 11/1967 | Colville et al. | 239/265.13 |
| 3,612,402 | 10/1971 | Timms | 239/265.29 |
| 3,670,964 | 6/1972 | Pedersen | 239/265.19 |

OTHER PUBLICATIONS (R74AEG452) Dusa et al., *Turbine Engine Exhaust Nozzle Performance Investigation, Phase I Interim Report*, The Boeing Company, May 1974.

*Primary Examiner*—Evon C. Blunk
*Assistant Examiner*—Andres Kashnikow
*Attorney, Agent, or Firm*—Robert C. Lampe, Jr.; Derek P. Lawrence

[57] ABSTRACT

A propulsion nozzle having a substantially cylindrical translatable shroud partially defining an outer flow duct and an articulated plug mounted within the shroud to partially define an inner coannular flow duct. A variable position valve comprises the downstream portion of the common wall between the ducts. The valve cooperates with the shroud and the plug, as required, to form a variable area throat for either flow duct, or both.

14 Claims, 3 Drawing Figures

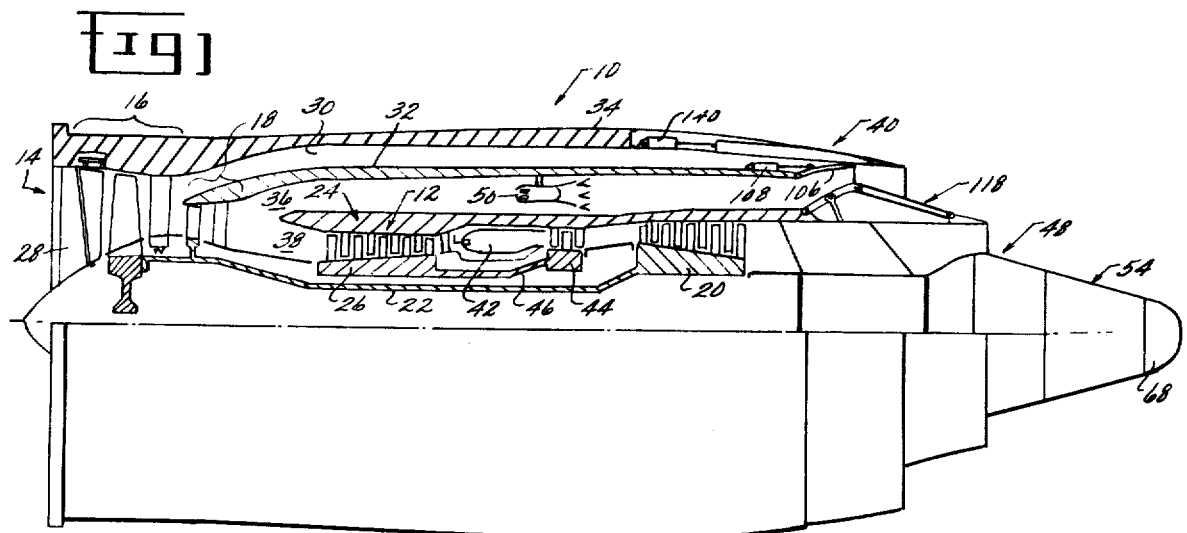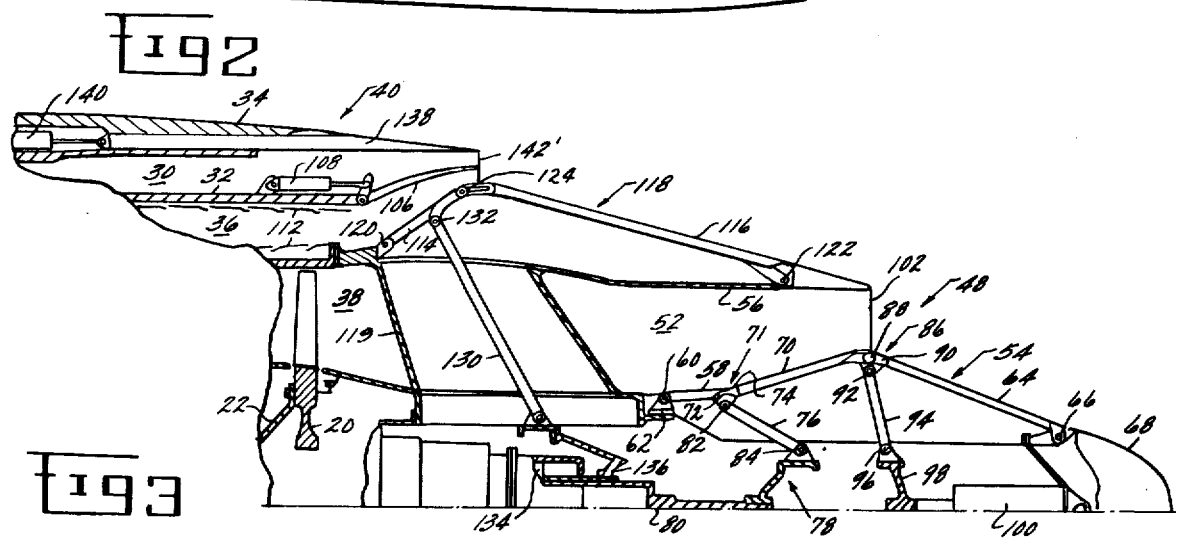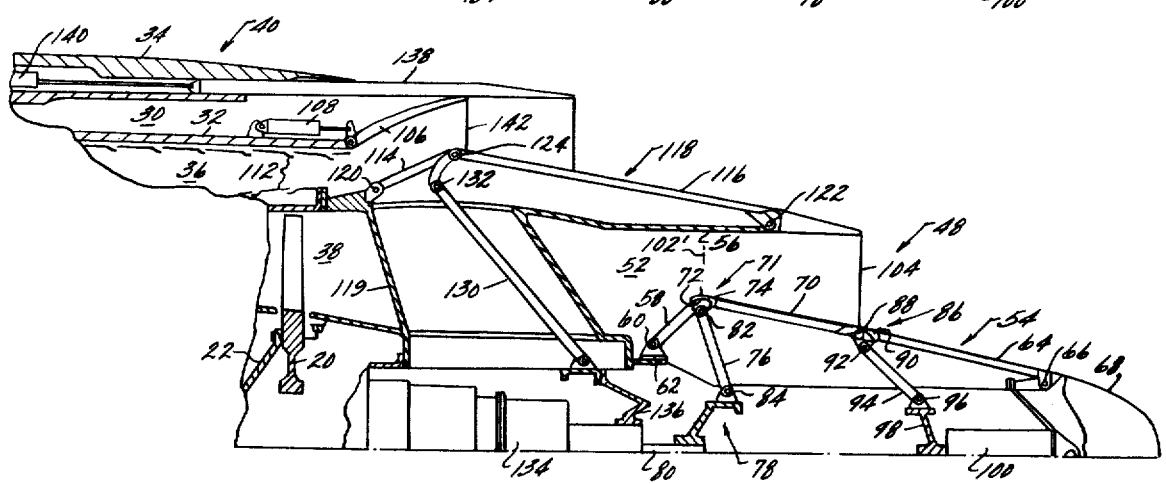

VARIABLE CYCLE PLUG NOZZLE AND FLAP AND METHOD OF OPERATING SAME

The invention herein described was made in the course of or under a contract, or a subcontract thereunder, with the United States Department of the Air Force.

BACKGROUND OF THE INVENTION

This invention relates to gas turbine engine exhaust nozzles and, more particularly, to high performance exhaust nozzles of the variable area variety.

Exahust systems are provided for gas turbine engines to direct the rapidly moving exhaust gases rearward into the atmosphere at a velocity and density necessary to produce the required thrust. The advent of new aircraft capable of flying advanced missions, with attendant high aerodynamic loading, requires the development of new propulsion system cycles, and has led to the need for new and unique exhaust nozzle systems. The requirements of the aircraft mission cannot be overlooked in the design of the exhaust system since the mission has a direct and formidable impact on both the performance and mechanical design requirements of the exhaust nozzle system. In particular, the mission impacts the nozzle design in two major areas: exhaust systems performance distribution throughout the flight envelope an exhaust system weight.

The performance of an exhaust nozzle is dictated, to a large extent, by the exhaust nozzle area. Th choice of nozzle area is determined by the temperature, mass airflow, velocity and pressure of the exhaust gases. Where the operating range of a gas turbine engine is relatively narrow, the area is optimized at the time of manufacture, and the minor benefits obtainable in performance by providing a variable area capability are offset by increased weight and complexity penalties. However, in modern, high performance engines with braod operating ranges, noise, thrust and fuel economy benefits may be achieved by use of variable area nozzles. In particular, nozzle performance and efficiency is dependent upon matching nozzle throat area (minimum flow area) and nozzle exit area as a function of pressure ratio across the nozzle.

The weight of an exhaust nozzle is dictated, to a large extent, by the complexity of the system in response to an attempt to improve nozzle performance and the structural hardware required to maintain integrity due to loading created by both the exhaust stream and high performance aircraft maneuvering. High maneuver loads by the aircraft cause large pressure differentials and, thus, high nozzle structural loading. To counteract these loadings, the exhaust system's structure and actuator systems require increased strength and, thus, increased weight. Clearly, in aircraft systems where weight is a paramount design consideration, the lightest weight exhaust system is desirable. However, in order for an exhaust system to be a viable concept, it must be mechanically feasible. By this, it is meant that the system must integrate well with both the engine and airframe, must act as a sufficient pressure vessel, and must provide for realistic actuator systems to avoid weight penalties and mechanical instabilities.

It becomes apparent, therefore, that a dichotomy exists when considering exhaust nozzle designs for advanced high performance aircraft since high multimission performance is only attainable with complicated and, thus, relatively heavy exhaust systems. Resolution of this problem requires extensive analysis and iteration of the aircraft mission requirements, the engine performance cycle, and the possible exhaust nozzle configurations.

The requirements of anticipated aircraft missions preclude the utilization of conventional nozzle systems. The convergent nozzle which is commonly used for subsonic flight loses its efficiency because the exhaust stream velocity cannot exceed sonic velocity (Mach number equals 1). The convergent-divergent exhaust nozzle permits controlled expansion and acceleration of the exhaust gases after they reach sonic velocity, but these nozzles have a very narrow optimum operating range and must be designed as variable area nozzles to compensate for this characteristic. While such variable area nozzles have been considered in the past, heretofore no exhaust nozzle schemes have been found to be satisfactory for adaptation to a wide range of anticipated future aircraft missions.

The problem becomes compounded in engines of the multiple bypass type wherein, in general, the number of nozzles is equivalent to the number of flow ducts within the engine. This is necessitated by the large differences in flow properties between each stream for most engine cycles which generally makes it impractical to combine these flows within the ducts. However, as the number of nozzles increases, so does the engine weight. Therefore, a system is required which provides flow modulation between multiple ducts which is of relatively simple and lightweight design, and which provides the necessary area variation throughout the mission cycle.

Summary of the Invention

Accordingly, it is the primary object of the present invention to provide a high performance, variable area gas turbine engine exhaust system of reduced complexity and weight.

It is a further object of the present invention to provide a simplified variable area exhaust system for a multiple bypass engine which maintains separate fan duct flow prior to the nozzle throat and which modulates the flow split between the ducts.

It is yet another object of the present invention to provide a method for operating a variable area propulsion nozzle for a multiple bypass gas turbine engine.

These and other objects and advantages will be more clearly understood from the following detailed description, the drawings and specific examples, all of which are intended to be typical of rather than in any way limiting to the scope of the present invention.

Briefly stated, the above objectives are accomplished in a multiple bypass engine wherein the fan flows, inner and outer, are contained in coannular ducts comprising three generally coaxial walls. The inner wall comprises two linkage actuated articulated flaps which form a variable geometry annular fan plug to provide nozzle throat area modulation capability. The outermost wall comprises a translatable shroud which provides area ratio variability for the combined expansion of the fan flows. The intermediate wall terminates in a variable position flap comprising a valve which may be positioned to cooperate with either the outer or inner wall (or both) to provide a variable area throat therebetween.

In the anticipated configuration, wherein the inner duct includes a combustor to augment the energy level of the inner duct stream in the supersonic mode, the variable position flap is in the closed position relative to the outer duct and a translatable shroud is extended aft of the nozzle throat. The translatable shroud and the variable geometry fan plug provide the throat area and nozzle exit area ratio variability for the fan nozzle to operate at its peak performance characteristic. In the subsonic cruise mode wherein the inner duct burner is inoperative, the overall fan throat area is controlled by the plug and the flow split modulated by the intermediate variable position flap. In this mode, the translatable shroud is retracted and is in general axial alignment with the intermediate variable position flap to form the throat of the outer duct flow therebetween. Thus, the throat is formed at the exit of both ducts in the nonaugmented subsonic mode to avoid scrubbing drag (friction of the flow over the nozzle expansion surfaces) and to allow for uniform free expansion of both duct streams. It is apparent, therefore, that the intermediate variable position flap cooperates to form the throat in either the subsonic or supersonic modes.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a side profile in partial cutaway schematically depicting a gas turbine engine incorporating the subject invention;

FIG. 2 is an enlarged schematic view depicting the exhaust nozzle of the engine of FIG. 1 in one operating mode; and FIG. 3 is an enlarged view, similar to FIG. 2, depicting the exhaust nozzle in another operating mode.

DESCRIPTION OF THE PREFERRED EMBODIMENT

Referring to the drawings wherein like numerals correspond to like elements throughout, attention is first directed to FIG. 1 wherein a gas turbine engine, depicted generally at 10, and which can embody the present invention, is diagrammatically shown. This engine may be considered as comprising generally a core engine 12, a fan assembly 14 including fan stages 16 and 18, and a fan turbine 20 which is interconnected to the fan assembly 14 by shaft 22. The core engine 12 includes an axial flow compressor 24 having a rotor 26. Air enters inlet 28 and is initially compressed by fan stage 16. A first portion of the compressed air enters the outer fan bypass duct 30 defined, in part, by annular wall 32 and a circumscribing fan nacelle 34. A second portion of the air is further compressed by fan stage 18 whereupon it is again split into portions, one portion entering inner bypass duct 36 defined, in part, by core engine 12 and circumscribing wall 32, and another portion entering core engine inlet 38. The flows inducts 30 and 36 are ultimately discharged through the fan exhaust nozzle, depicted generally at 40.

Compressed air entering inlet 38 is further compressed by the axial flow compressor 24 and then is discharged to a combustor 42 where fuel is burned to provide high energy combustion gases which drive a turbine 44. The turbine 44, in turn, drives the rotor 26 through a shaft 46 in the usual manner of a gas turbine engine. The hot gases of combustion are then passed to and drive the fan turbine 20 which, in turn, drives the fan assembly 14. A propulsive force is thus obtained by the action of the fan assembly 14 discharging air from ducts 30 and 36 through fan exhaust nozzle 40 and by the discharge of combustion gases from a core engine exhaust nozzle indicated generally by 48. For increased thrust, the energy level of the air in duct 36 may be augmented by means of an auxiliary combustor (or duct burner) 50.

The above description is anticipatory of many future gas turbine engines of the "variable cycle" or "multiple bypass" type and is not meant to be limiting as it will become readily apparent from the following description that the present invention is capable of application to any gas turbine engine and is not necessarily limited to the embodiment depicted in FIG. 1. The foregoing description, therefore, is merely meant to be illustrative of one type of application.

Attention is now directed to FIGS. 2 and 3, wherein the fan exhaust nozzle 40 and core engine exhaust nozzle 48 are depicted in greater detail. Considering first the core engine exhaust nozzle 48, it is apparent that a core exhaust stream flow path 52 is partially defined by an annular articulating plug 54 and a cooperating coannular stationary shroud 56 of generally fixed diameter. As will be seen, the core exhaust stream flow path area variation provided by the articulating plug will be a contributing element enabling the engine to achieve maximum performance at all flight modes.

The articulating plug is shown to comprise three serially connected flaps (For the sake of simplicity, only half of the nozzle is shown though it is recognized that the nozzle is essentially annular.) Forwardmost flap 58 (to the left in FIG. 2) is hinge connected at 60 to relatively rigid stationary structural member 62 which may comprise either a flow path defining element or, as shown, internal support structure. Similarly, the rearwardmost flap 64 is hinge connected at 66 to the relatively rigid centerbody plug 68. Intermediate flap 70 is operatively connected to flaps 58 and 64 in a manner to be described to complete the flow path definition. Since plug 54 is generally annular in cross section it is recognized that in the present embodiment flaps 58, 64 and 70 are each representative of a plurality of flaps extending about the circumference of the plug to define, with shroud 56, the annular flow path 52. However, only singular flaps are shown herein for clarity.

The joint 71 interconnecting flaps 58 and 70 comprises a joint of the articulated variety. A concave, generally spherical seat 72 formed upon flap 58 cooperates with a concave, generally spherical surface 74 upon the forward end of flap 70 to form a knuckle joint. While a positive mechanical interconnection (not shown) between elements 72 and 74 may be necessary in some applications, it is anticipated that the exhaust gas pressure load upon flap 58 will be sufficient to maintain intimate contact between the two elements in some applications. The forward end of flap 70 is connected by means of link 76 to a first carriage assembly, denominated generally as 78, which is caused to translate axially by means of a first actuator 80. Due to hinge connections 82 and 84, as carriage assembly 78 is translated forward and aft, articulated links 58 and 70 are caused to move radially outwardly and inwardly, respectively, at joint 71.

Similarly, joint 86 interconnecting flaps 70 and 64 is of the articulated variety having a cam 88 upon the rearward end of flap 70 adapted to ride in a cam track or slot 90 formed upon the forward end of flap 64. Joint 86 is hinge connected at 92 to a link 94 which, in turn, is hinge connected at 96 to a second axially translatable carriage assembly 98. Actuator 100 provides the motive force to translate carriage assembly 98 forward and aft, thus moving joint 86 radially outwardly and inwardly, respectively. Thus, the motion of joint 71 may be controlled independently of the motion of joint 86. As will become apparent, the combination of hinged flaps and articulated joints provides a reasonably well defined flow path for the entire mission cycle.

In operation, in the subsonic mode of FIG. 2, the nozzle behaves as a conventional variable throat area plug with low internal area ratio. Flaps 64 and 70 are in the extended position at joint 86 while joint 71 is retracted. Actuator 100 is used to optimize the nozzle throat area 102 formed between joint 86 and the trailing edge (downstream end) of shroud 56 as a function of engine operating condition and is controlled by an engine control not shown. Flap 58 is held fixed during this mode. As engine power setting increases in the subsonic mode, the nozzle throat area 102 would be scheduled to increase. Continuing, as the augmented mode is initiated in the fan duct 36 (FIG. 1), it become necessary to both decrease the throat area and increase the nozzle area ratio (ratio of nozzle exit area to nozzle throat area) due to the cycle pressure ratio increase. This may be accomplished by closing the nozzle throat with actuator 80. Accordingly, carriage assembly 78 is translated forward (to the left), driving flaps 58 and 70 radially outwardly as shown in FIG. 3. In this mode, carriage assembly 98 has already been translated to its full aft position by means of actuator 100. Therefore, the nozzle throat 102' in the supersonic mode, is translated inside the nozzle by positioning flaps 58 and 70 so as to form the throat in cooperation with the opposed portion of fixed diameter shroud 56, while the remaining shroud portion, in cooperation with flaps 70 and 64, provides an exhaust stream expansion surface to accelerate the flow to the nozzle exit plane 104. Thus, high supersonic performance is obtained due to the optimum internal-external area ratio combination.

To obtain the same nozzle area scheduling without the articulated plug of the present invention would require either translating forward and aft a core plug and its attendant mechanisms, or providing shroud 56 with a translatable extension. This latter arrangement would involve a degree of risk since any hydraulic actuation structure would necessarily be disposed between two very hot gas streams. Clearly, the present invention comprises an improvement over such schemes. While the core nozzle of FIGS. 1 through 3 is depicted to be of the annular articulated plug type, it can be appreciated that the concept may be embodied equally well in a nozzle of the "two-dimensional" or "rectangular" type having a generally constant cross-sectional profile of FIGS. 2 and 3, thereby permitting a better integration of the airframe and exhaust nozzle structure.

Directing attention now to the fan nozzle 40 of FIGS. 2 and 3, there is depicted therein a double annular bypass configuration comprising coannular outer bypass duct 30 and inner bypass duct 36 as previously described and having a common intermediate wall 32. Wall 32 is shown as terminating in a variable position flap 106 comprising a valve, the flap being positionable by means of actuator 108 to preclude flow through either duct 30 or 36.

As depicted in FIG. 1, inner duct 36 is provided with a duct burner 50 to augment the energy level of the inner duct flow to provide increased thrust in the supersonic mode. Accordingly, the duct 36 is provided with a known thermal liner 112 for cooling purposes as will be understood in the art.

The radially inner wall of duct 36 terminates in two linkage actuated, articulated flaps 114 and 116 which form a variable geometry annular fan plug indicated generally as 118. The forwardmost flap 114 (to the left in FIG. 2) is hinge connected to a rigid structure such as strut 119 at 120 while the aft end of flap 166 is hinge connected to the stationary shroud 56 at 122. Flaps 114 and 116 are interconnected by means of an articulated joint 124 comprising a cooperating cam and track arrangement. Link 130 is operatively connected to flap 114 at 132 and transfers motion from an actuator 134 to flap 114. In particular, as actuator 135 translates carriage assembly 135 forward and aft, the fan plug 118 is caused to move radially outwardly and inwardly, respectively. In order to minimize the effect of aerodynamic drag on link 130, it is disposed within an existing hollow strut 119 supporting annular shroud 56. Actuator 134 is disposed proximate the engine centerline within the core engine to minimize hydraulic complexity and to provide adequate cooling thereof.

The radially outer wall 34 of duct 30 terminates in a translatable shroud 138 which is telescopically received within fan nacelle 34 and which may be deployed to an aft extending position by means of a suitable actuation system 140. Shroud 138 cooperates with articulated fan plug 118 to form a throat (minimum flow area) 142 therebetween. When shroud 138 is retracted (FIG. 2), the throat is formed at the trailing edge of the shroud while, in the extended mode (FIG. 3), shroud 138 and flap 116 cooperate to form an expansion portion of the nozzle to accelerate the flow.

Flap 106 is adapted to cooperate with nozzle plug 118 in the nonaugmented mode of FIG. 3 to form the throat 142 therebetween, whereas in the nonaugmented mode of FIG. 2, the flap 106 cooperates with both the nozzle plug 118 and shroud 138 to form a pair of coannular throats 142' therebetween. (It is anticipated that in the subsonic mode flap 106 may be utilized to terminate the outer duct flow or the inner duct flow entirely.) In the sub-sonic operational mode it becomes apparent that the bypass duct throat (or throats) are formed in general alignment with the trailing edge of shroud 138.

In operation, in the subsonic, unaugmented configuration of FIG. 2 wherein the duct burner is inoperative, the overall fan throat area is controlled by the articulated plug, and the flow split between ducts is modulated by the intermediate flap 106. In this mode, the translatable shroud 138 is retracted to its position in general alignment with flaps 106. Depending upon the flow split desired, a pair of throats may be formed for the coannular duct streams. By forming the throats at the exits of both ducts, scrubbing drag is minimized and the duct streams are permitted to expand uniformly and freely.

In the augmented mode (FIG. 3) wherein inner duct flow is energized by means of duct burner 50, the variable position flap 106 is in the closed position relative to the outer duct and the translatable shroud 138 is extended aft of the nozzle throat. Translatable shroud 138 and articulated plug 118 provide the necessary throat area and exit area ratio variability for the fan nozzle to operate at its peak performance characteristic. Typically, the throat area would be relatively open as in FIG. 3, with actuator 134 forcing carriage 135 aft, thus inducing link 130 to draw flaps 114 and 116 radially inwardly.

Thus, a simplified nozzle has been provided for multiple duct applications. No longer need the number of nozzles equal the number of duct flows to provide flow modulation and performance optimization throughout the mission cycle. In essence, the present invention provides for the necessary moving parts to serve dual functions to eliminate redundancy. Furthermore, this provides for simplicity inn nozzle fabrication and a reduction in weight. And, finally, the exhaust nozzle structure of the present invention is mechanically feasible in that it integrates well with both existing and anticipated engines/airframes and utilizes realistic actuator systems to avoid weight penalties and mechanical instabilities. High performance maneuver loads can be tolerated by such a system.

It will become obvious to one skilled in the art that certain changes can be made to the above-described invention without departing from the broad inventive concepts thereof. For example, where multiple actuators are employed, they could be replaced with a single integrated actuation system. Further, actuators of any of several varieties may be employed. It is intended that the appended claims cover these and all other variations in the present invention's broader inventive concepts.

Having thus described the invention, what is considered novel and desired to be secured by Letters Patent of the United States is:

1. A propulsion nozzle comprising:
   a shroud partially defining an outer flow duct;
   an articulated plug mounted within said shroud to partially define an inner flow duct; and
   a variable position valve means mounted intermediate said shroud and said plug and cooperating therewith to partially define said inner and said outer ducts, said valve being positionable to form a variable throat, as desired, either in cooperation with said plug for said inner duct, or in cooperation with said shroud for said outer duct, or both and
   wherein said shroud is translatable to a position downstream of said valve means to partially define, in cooperation with said plug, a flow expansion portion of said nozzle.

2. The propulsion nozzle as recited in claim 1 wherein all throats are formed at substantially the downstream end of said valve means.

3. The propulsion nozzle as recited in claim 1 wherein said shroud is telescopically received with a stationary wall further defining said outer flow duct.

4. The propulsion nozzle as recited in claim 1 wherein said articulated plug comprises first and second flap means serially connected by means of an articulated joint which is radially positionable for throat area modulation.

5. The propulsion nozzle as recited in claim 4 further comprising means for positioning said articulated joint, said positioning means comprising an actuator and an operative link connection between said actuator and said plug.

6. The propulsion nozzle as recited in claim 5 wherein said variable position valve means is disposed radially outwardly of a core engine and wherein said actuator is disposed within the core engine.

7. The propulsion nozzle as recited in claim 4 further comprising a stationary support structure upstream of said articulated plug and wherein said first and second flap means are serially connected to said stationary support structure.

8. The propulsion nozzle as recited in claim 1 wherein said variable position valve means comprises a pivotable flap.

9. The propulsion nozzle as recited in claim 1 wherein said outer and inner flow ducts are coannular.

10. In a method of operating a propulsion nozzle comprising
    a translatable shroud partially defining an outer flow duct,
    an articulated plug mounted within said shroud to partially define an inner flow duct, and
    a variable position flap comprising the downstream end of a common wall between said ducts, the steps of:
    positioning the articulated plug to modulate the throat area of the total flow passing through both ducts and
    modulating the flow split between ducts by means of the variable position flap.

11. The method as recited in claim 10 comprising the further step of forming a pair of throats, one for each duct, substantially at the downstream end of said flap.

12. The method as recited in claim 11 wherein a first throat is formed between said flap and said shroud at their respective downstream ends.

13. The method as recited in claim 12 wherein a second throat is formed between said flap and said plug at the downstream end of said flap.

14. The method as recited in claim 10 further comprising the steps of:
    augmenting the inner duct flow;
    positioning the flap to terminate flow through the outer duct;
    passing the augmented flow through a variable area throat formed between said plug and said flap; and thereafter
    expanding the augmented flow through a nozzle section defined by said shroud and said plug.

* * * * *